Jan. 15, 1963 T. B. DALTON 3,073,572
LANDING GEAR LEG STRUCTURE
Filed July 1, 1960 7 Sheets-Sheet 1

INVENTOR.
THOMAS B. DALTON
BY
Barnes, Kisselle, Raisch & Choate
ATTORNEYS

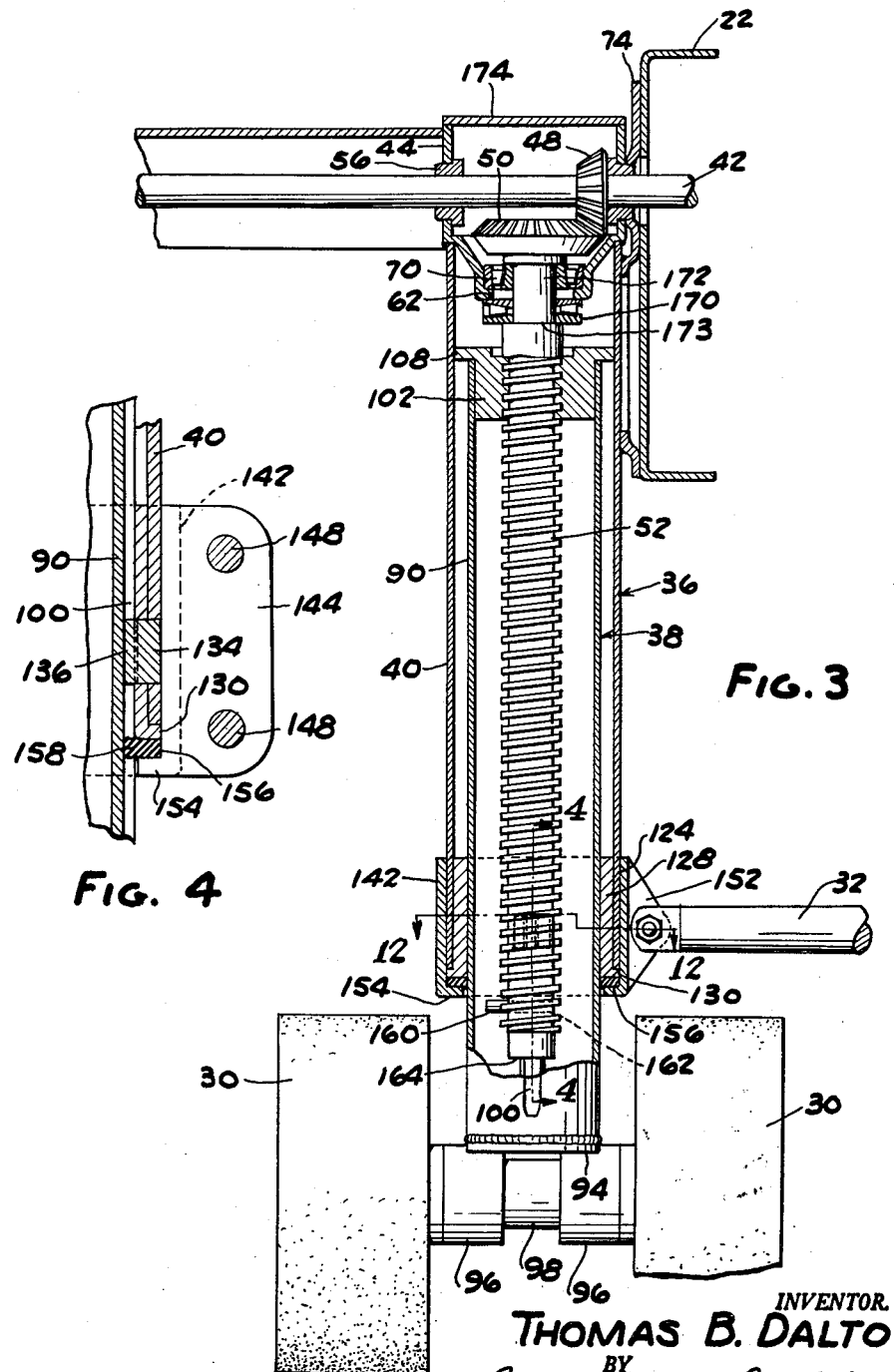

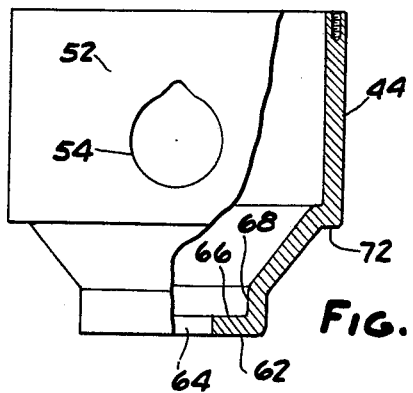
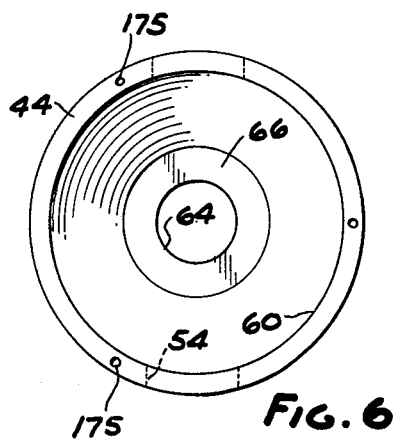
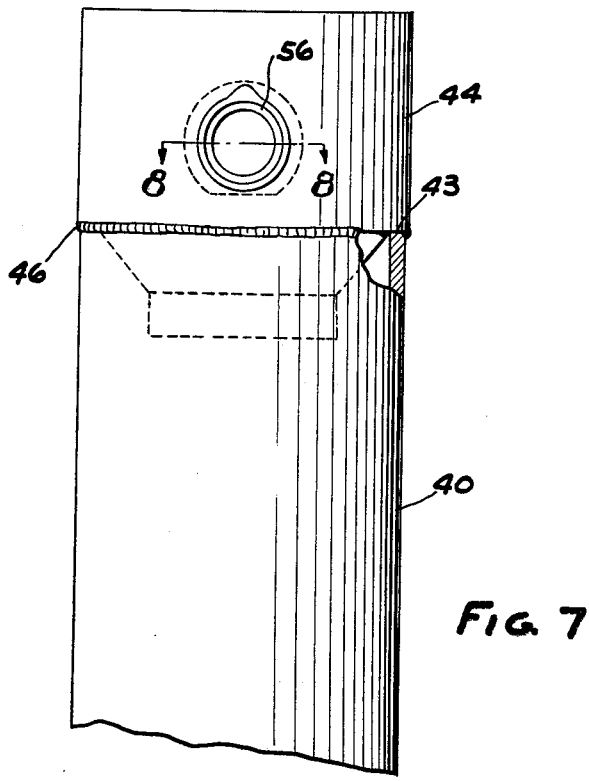
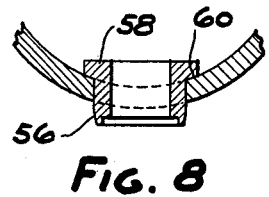

Jan. 15, 1963

T. B. DALTON 3,073,572

LANDING GEAR LEG STRUCTURE

Filed July 1, 1960

INVENTOR.
THOMAS B. DALTON
BY
Barnes, Kisselle, Raisch & Choate
ATTORNEYS

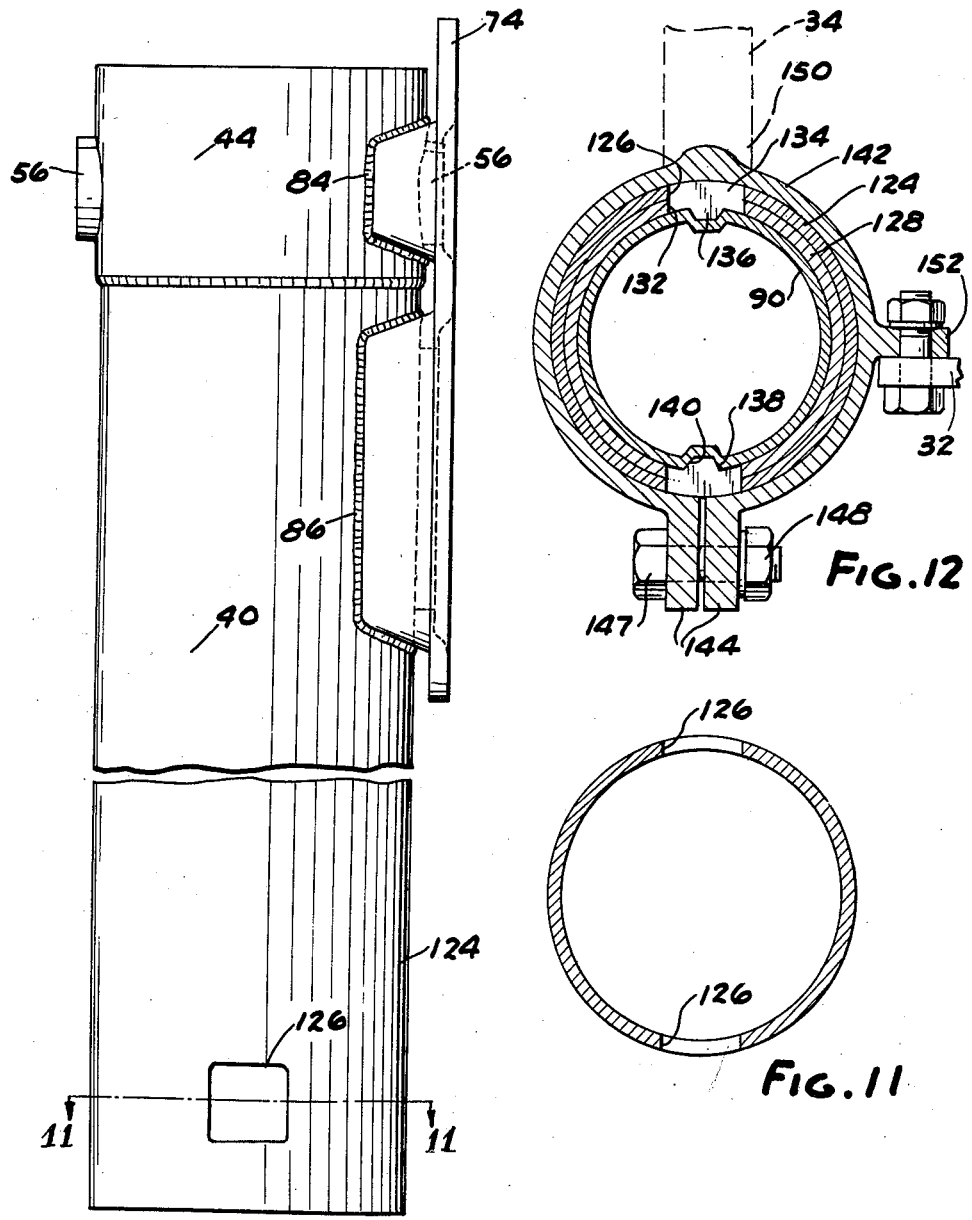

Jan. 15, 1963  T. B. DALTON  3,073,572
LANDING GEAR LEG STRUCTURE
Filed July 1, 1960  7 Sheets-Sheet 6

INVENTOR.
THOMAS B. DALTON
BY
Barnes, Kisselle, Raisch & Choate
ATTORNEYS

Jan. 15, 1963 T. B. DALTON 3,073,572
LANDING GEAR LEG STRUCTURE
Filed July 1, 1960 7 Sheets-Sheet 7

INVENTOR.
THOMAS B. DALTON
BY
Barnes, Kisselle, Raisch, Choate
ATTORNEYS

United States Patent Office 3,073,572
Patented Jan. 15, 1963

1

3,073,572
LANDING GEAR LEG STRUCTURE
Thomas B. Dalton, Muskegon, Mich., assignor to West
Michigan Steel Foundry, Muskegon, Mich., a corporation of Michigan
Filed July 1, 1960, Ser. No. 40,238
5 Claims. (Cl. 254—86)

This invention relates to a leg structure in the legs of landing gear of the type used to support the forward end of a semi-trailer when it is uncoupled from a tractor.

Conventionally, a landing gear leg comprises upper and lower tubular leg members which telescope relative to each other for lengthening the leg to a trailer supporting position and shortening it to a retracted position. The leg members are actuated by a jackscrew and nut mechanism with a shaft and gearing for operating the jackscrew being mounted in a housing adjacent the top of the upper leg.

Heretofore, the gear housing has consisted of a relatively heavy casting which had to be machined at numerous places to provide surfaces suitable for engaging other components of the leg assembly. Heretofore, the various means for securing the leg members against realtive rotation have not been completely satisfactory from the standpoint either of manufacturing cost or freedom from failure in use.

The object of this invention is to provide a strong landing gear leg structure which is lighter in weight and less expensive of manufacture than previous structures and which has improved means for securing the upper and lower leg members against relative rotation in use.

Generally the invention contemplates forming the jackscrew gear housing of a cup-shaped metal stamping which is pierced to provide the various openings required therein, the surfaces provided by the drawing or stamping and piercing, without being further machined, being engaged directly against other components of the landing gear. The inner lower leg member is indented to provide an external groove engaged by a spline on the upper leg member. The components are aranged to facilitate rapid convenient assembly during manufacture by inserting an assembly of the lower leg member, jackscrew, and nut upwardly into the upper leg member.

In the drawings:

FIG. 3 is an enlarged generally vertical sectional view of the landing gear leg.

FIG. 4 is an enlarged sectional view on line 4—4 in FIG. 3.

FIG. 5 is an elevational view of a stamping forming the gear housing at the upper end of the leg, with a portion broken away to illustrate structure.

FIG. 6 is a plan view of the stamping.

FIG. 7 is an elevational view illustrating the stamping welded to the top of the leg, a portion being broken away and portions being shown in phantom to illustrate structure.

FIG. 8 is a sectional view on line 8—8 of FIG. 7.

FIG. 10 is an elevational view illustrating the upper leg member welded to the mounting plate.

FIG. 11 is a section on 11—11 of FIG. 10.

2

FIG. 12 is an enlarged sectional view on line 12—12 of FIG. 3 with the jackscrew omitted.

Figures 13, 14:
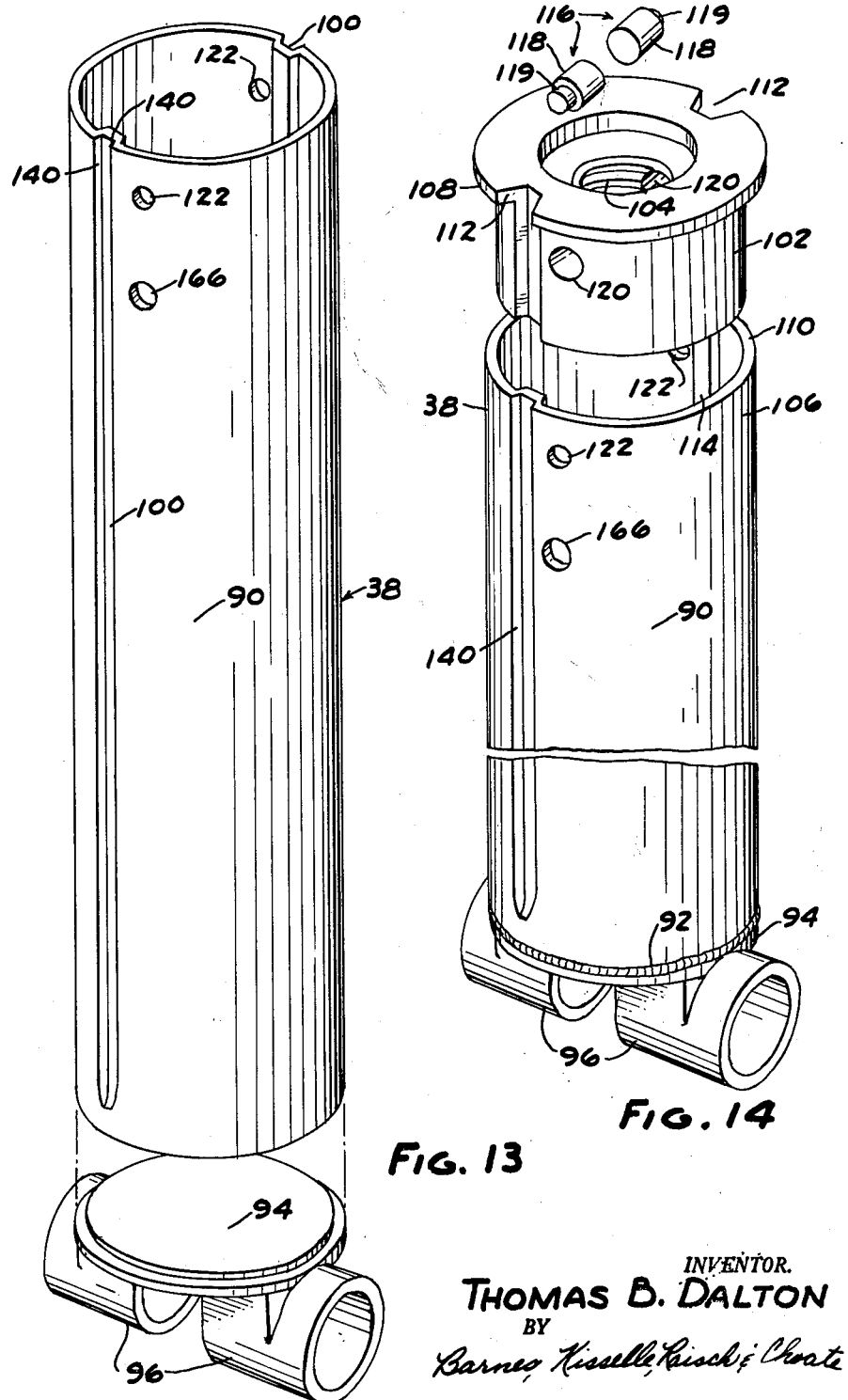

FIG. 13 is a perspective exploded view of the lower leg member and its bottom plate.

FIG. 14 is a perspective exploded view of the lower leg member and jackscrew nut prior to their assembly.

Figure 15:
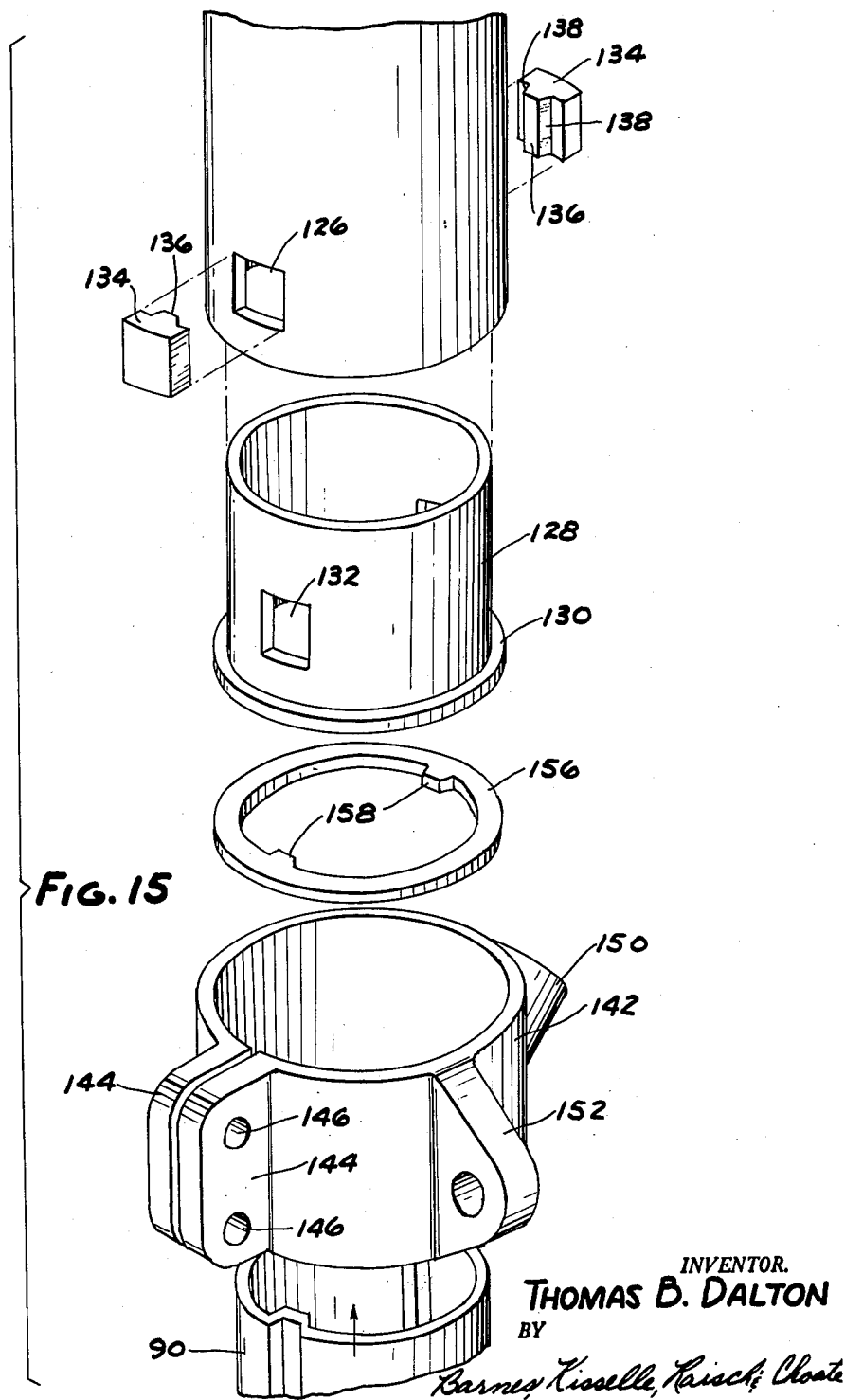

FIG. 15 is an exploded perspective view illustrating the parts forming the connection between the upper and lower leg members prior to assembly thereof.

Shown in the drawings is the forward end of a semi-trailer 20 having frame members 22 to which a landing gear 24 is secured. The landing gear legs 26 and 28 are constructed in accordance with this convention and are identical except for having right and left hand relation. Each leg has ground engaging means such as wheels 30 at its lower end. A lateral brace 32 is provided between the legs and each leg has a rear supporting strut 34 anchored at its upper end to frame 22. Each leg includes an upper tubular member 36 and a lower tubular member 38 which are telescoped vertically by means of a jackscrew mechanism to be described which is operated by a crank 39 through shafting 42. Upper leg member 36 comprises a tube 40 having an upper end face 43 (FIG. 7) to which a cup-shaped stamping 44 is secured by welding 46. Stamping 44 provides a housing for bevel gears 48 and 50 (FIG. 3) through which a jackscrew 52 is operated by rotation of shafting 42.

Stamping 44 has cylindrical side walls 52 which are pierced to provide openings 54 into which bushings 56 are press fitted for receiving shaft 42. Each bushing 56 has a flange 58 which engages a surface portion 60 of the stamping immediately surrounding opening 54. Stamping 44 has a bottom portion 62 pierced to provide an opening 64 through which the upper end of jackscrew 52 passes. Immediately surrounding opening 64 is a radial surface 66 and a contiguous axial or vertical surface 68, these surfaces containing a bearing 70 providing a journal for the upper end of jackscrew 52. Stamping 44 has an external annular face 72 which seats directly against end portion 43 of tube 40 when the stamping is welded to the end of the tube. Stamping surface portions 60, 62, 66, 68 and 72 are the drawn metal surfaces provided during the stamping or drawing of cup 44. These surfaces are engaged against the other components of the leg structure without further machining. Similarly, the surfaces defining bushing openings 54 and jackscrew opening 64 are the surfaces provided by piercing of the metal of cup 44 without further machining.

Figure 9:
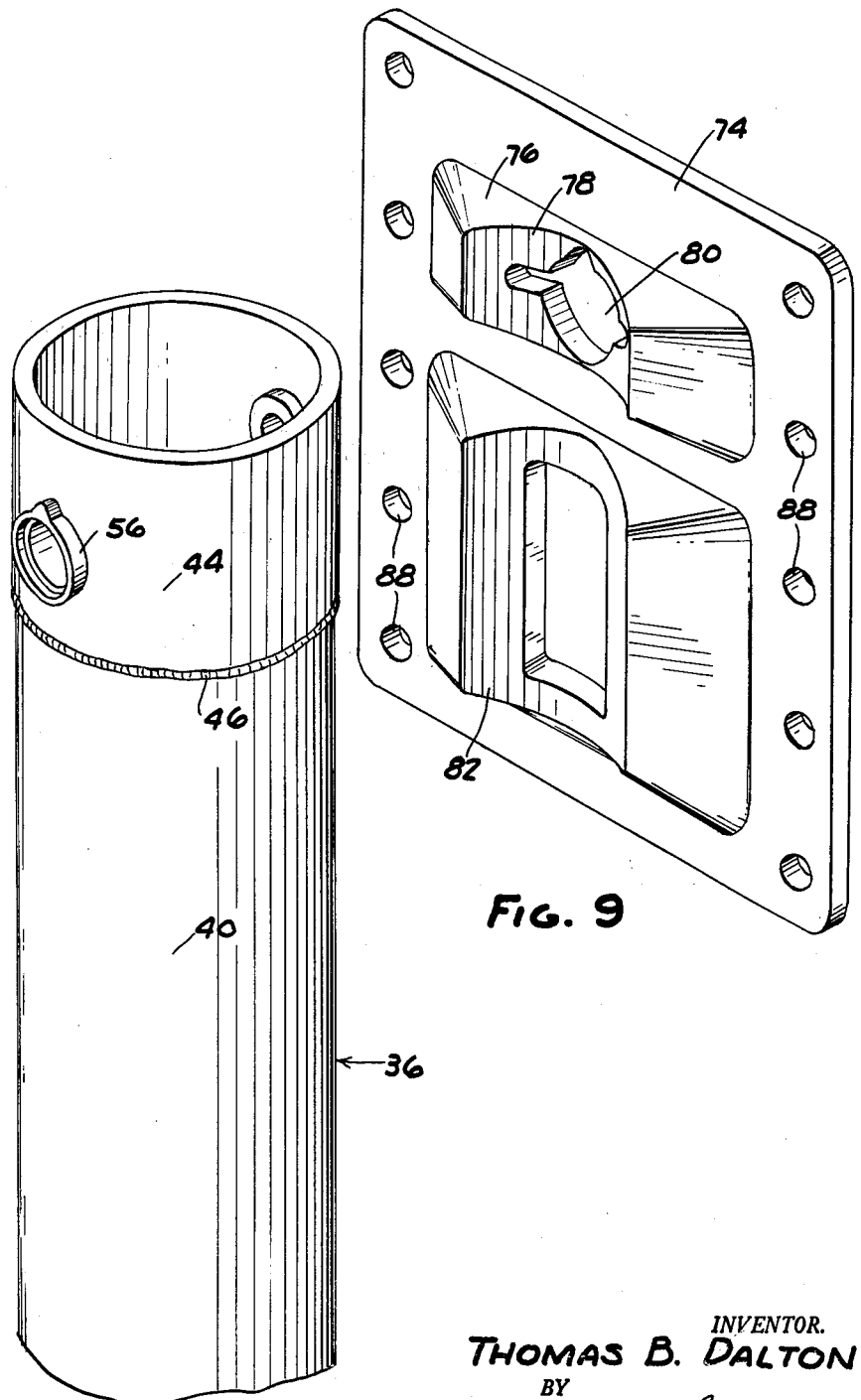
FIG. 9 is a perspective exploded view illustrating the relation between the upper end of the leg and its mounting plate.

After cup 44 has been welded to tube 40 and bushings 56 press fitted into openings 54, the resulting upper leg member 36 is assembled with a mounting plate 74 (FIGS. 9 and 10). Plate 74 has an upper saddle 76 with a concave surface 78 which seats against the cylindrical exterior of cup 44. The saddle has an opening 80 into which an exteriorly projecting portion of bushing 56 fits. Plate 74 has a second saddle 82 engaged by the cylindrical exterior of tube 40. The cup and tube are welded to the saddles as at 84 and 86 (FIG. 10). Mounting plate 74 has flange portions with bolt holes 88 to facilitate bolting onto trailer frame 22.

Lower leg member 38 comprises a tube 90 having welded at its lower end as at 92 (FIG. 14) a cover plate 94 which carries a pair of bearings 96 which receive an axle 98 on which ground engaging wheels 30 are mounted. Tube 90 has one or more longitudinal grooves 100 in its external surface and these grooves extend longitudinally a distance at least as great as the extension and retracting stroke of the lower leg member in moving to and from its ground engaging and retracted positions. The grooves are preferably formed by deforming the metal of the tube wall inwardly by a rolling process.

By this means the grooves can be given considerable depth, for example a depth equal to the thickness of the tube wall as shown in FIG. 12. Where two grooves are used as in the illustration, the grooves are preferably disposed diametrically opposite each other. This facilitates roll forming of the grooves and also enables the grooves to be positioned at the forward and rearward extremities of the leg relative to the longitudinal direction of the vehicle so that the metal forming the grooves also provides stiffening ribs which resist bending or distortion of the lower legs when the vehicle is moved over a surface on its landing gear wheels 30.

A jackscrew nut 102 having internal threads 104 for engagement with jackscrew 52 is secured within the upper end portion 106 of leg tube 90 with an outward flange 108 on the nut engaging the upper end face 110 of the tube. In heavy duty gear, flange 108 has a diameter greater than the outer diameter of tube 90 for a purpose to be described. Nut 102 has longitudinal recesses 112 which accommodate the elongate inward indentations 114 formed in rolling grooves 100. The nut is secured within the tube by a number of shouldered pins 116 having heads 118 and shanks 119 having a clearance fit respectively through holes 120 in the threaded portions of nut 102 and smaller holes 122 in the upper end of tube 90.

The lower end portion 124 of the upper leg tube is provided with an opening 126 for each groove 100 in the lower leg tube 90. A bearing and reinforcing sleeve 128 is interposed between lower leg portion 124 and lower leg tube 90 and this sleeve has a flange 130 adjacent its lower end which engages the lower end face of tube portion 124. Sleeve 128 has an opening 132 for each opening 126 in the upper leg tube. Openings 132 are longitudinally aligned with openings 126 when sleeve flange 130 engages the end of tube portion 124.

An insert 134 is fitted into each pair of aligned openings 126 and 132 and has a spline projection 136 which projects inwardly of sleeve 128 into slidable spline engagement with a groove 100 in the lower leg tube. The spline surfaces 138 of projection 136 and the complementary side surfaces 140 of groove 100 (FIGS. 12, 13 and 15) are disposed at obtuse angles to the intersecting tangents of lower leg tube 90 to minimize the tendency of the tube and insert to be cammed away from each other, and this, taken with the depth of the groove, insures against disengagement of the spline insert from the groove.

A split collar 142 is provided around lower portion 124 of the upper leg tube and this collar retains spline inserts 134 in place in their respective openings. Collar 142 has a pair of radial lugs 144 which have aligned openings 146 through which bolts 147 pass for threaded engagement with nuts 148 to clampingly contract the collar around the leg, sleeve, and insert assembly. Collar 142 has a rear boss 150 for engagement with rear landing gear strut 34 and has another boss 152 apertured for bolted engagement with cross brace 32 as shown.

Collar 142 has adjacent its lower end an inwardly extending annular flange 154 and a dirt and grease seal 156 is contained in wiping engagement around lower leg tube 90 between this flange and flange 130 on sleeve 128. Seal 156 is made of a suitable sealing material such as a natural or synthetic rubber or other elastomeric material. Seal ring 156 has a pair of inward projections 158 engageable complementally within spline grooves 100 in the lower leg tube to maintain the continuity of the seal across the groove regions.

To assemble the leg, the upper leg member 36 is welded to its mounting plate 74 and lower leg 38 is welded to its bottom plate 94 in the manner described. Split collar 142, seal ring 156 and sleeve 128 are then inserted over the lower end of lower leg tube 90 in that order. Jackscrew nut 102 is then dropped into place in the top end of lower leg tube 90 and flange 108 brought into engagement with the top end face 110 of the tube. Tube indentations 114 engage within nut recesses 112 and holes 120 and 122 in the nut and tube respectively are aligned. Pins 116 are inserted outwardly into nut openings 120 so that their shanks 119 project into tube openings 122 and their shoulders engage the interior surface of the tube. This is easily done manually because of the clearance fit between the pins and openings. Jackscrew 52 is then threaded into the nut until a stop pin 160 (FIG. 3) press fitted into a through opening 162 in its lower end 164 is brought into alignment with a hole 166 in lower leg tube 90. (FIGS. 13 and 14). A punch (not shown) is then inserted through hole 166 and pin 160 is driven partially out of hole 162 so that it projects radially outwardly of jackscrew 152 to provide a stop for engaging nut 102. The jackscrew retains pins 116 within openings 120 and 122.

The jackscrew is then turned all the way down to the FIG. 3 position wherein threads 104 run out and stop the screw. A thrust bearing 170 is inserted over the upper end portion 172 of the jackscrew and seated on a shoulder 173 thereon. The upper end of leg tube 90 and sleeve 128 are then inserted into lower end portion 124 of the upper leg tube and sleeve flange 130 is engaged against the bottom end of the upper tube. This aligns openings 126 and 132 in the upper tube and the sleeve. Inserts 134 are now inserted through the aligned openings with spline projections 136 engaged within grooves 100 in the lower tube. Collar 142 is now slipped upwardly around the exterior of the lower end of the upper tube until seal 156 engages sleeve flange 130. Clamping bolts 147 are now passed through their openings 146 in lugs 144 and tightened to secure lower leg portion 124, sleeve 128, inserts 136, and seal 156 in assembled relation.

Lower leg tube 90 is then slipped upwardly in the outer tube until the upper end 172 of the jackscrew passes through the bottom opening 64 in gear housing cup 44 and thrust bearing 170 engages against bottom surface 62 of the cup. Bearing 70 and beveled gearing 48 and 50 together with a portion of shafting 42 may then be installed. Gear housing 44 is then covered by a plate 174 secured in place as by screws (not shown) threaded into suitable holes 175 (FIG. 6) in the housing.

This leg structure facilitates considerable savings in the cost of manufacture which are passed on to the ultimate consumer. In part, these savings are effected by eliminating the necessity for machining operations of eight different surfaces in the gear housing head 44, these surfaces being two each at 54 and 60, and one each at 62, 66, 68 and 72 as pointed out above. The savings are also facilitated in part by the simple assembly procedure described. One feature adding to simplicity of assembly is that lower end plate 94 with its bearing elements 96, nut 102, jackscrew 52 and thrust bearing 170 can all be assembled to lower leg tube 90 before the latter is inserted into outer leg tube 40. In this regard it is to be noted that nut flange 108 has a diameter no greater than the inner diameter of the lower end portion 124 of the outer tube.

The lower end 124 of tube 40 co-operates with sleeve 128 and collar 142 to provide strong lateral support for the lower leg 38 in its downward position. Engagement of nut flange 108 with the interior of outer leg tube 40 supplements this support, enabling the gear to be used under severe conditions such as where the supported vehicle, which may be an army vehicle, is operated over relatively rough ground. Where the vehicle is to be operated only on relatively smooth surfaces or pavement as commercial vehicles usually are, the enlarged nut flange is unnecessary, tube end 124, sleeve 128, collar 142 and interengaged nut 102 and jackscrew 52 providing sufficient lateral support.

Figure 1:
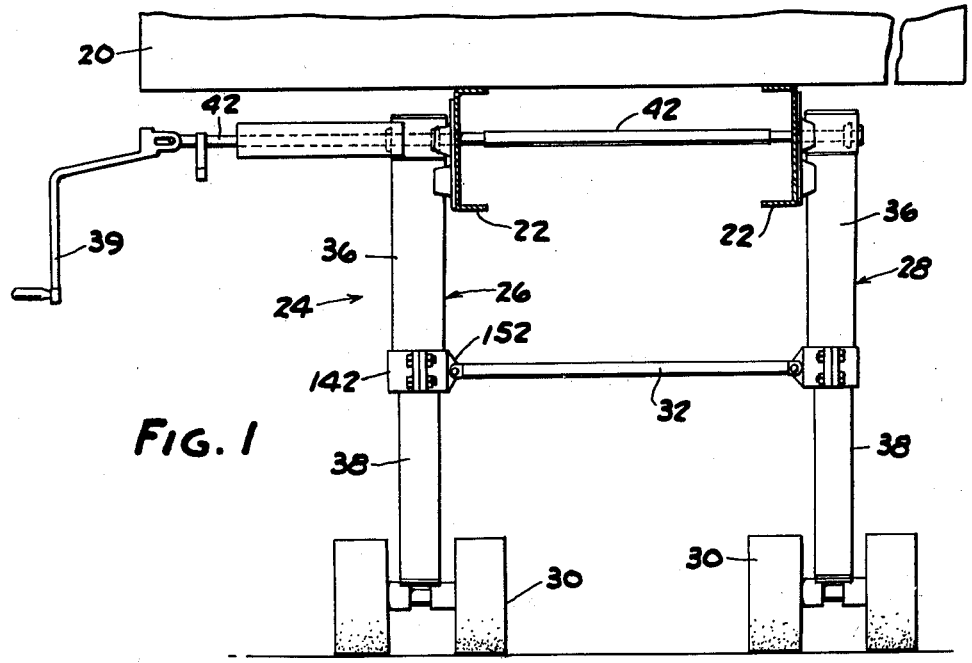
FIG. 1 is generally a front elevational view of a semi-trailer landing gear having a leg structure according to the present invention.
Figure 2:
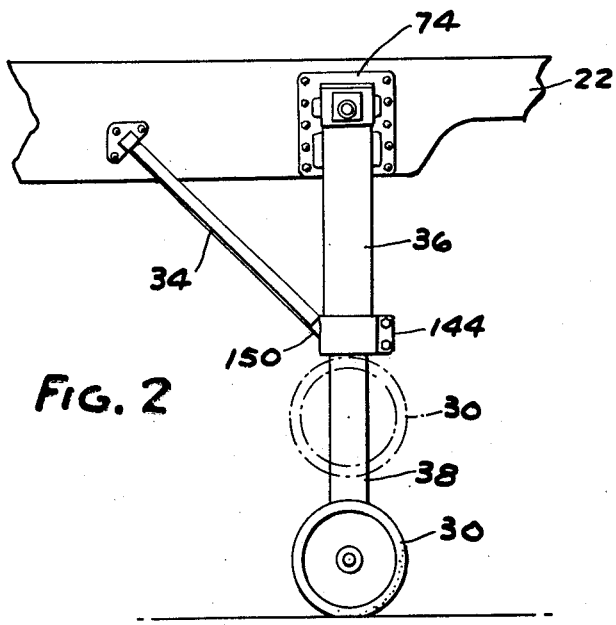
FIG. 2 is a side elevational view of the landing gear with the ground engaging wheels being shown in dotted lines in a retracted position.

In use, it may be assumed that landing gear legs 26 and 28 have been assembled to semi-trailer 20 as illustrated in FIGS. 1 and 2. The legs are operated between their downward ground engaging position and their upward retracted position merely by turning operating handle 39 which rotates shafting 42 to drive jackscrew 52 through bevel gears 48 and 50. Inner tube 90 telescopes with respect to outer tube 40 in sliding engagement with the guiding and reinforcing sleeve 128 and spline projections 136 on inserts 134 engage in grooves 100 on the lower tube. Collar 142 securely holds the inserts in place and the support of the collar plus the angles and depth of the inter-engaging splines and grooves makes it virtually impossible for the inner and outer tubes to twist rotationally relative to each other under any loads which the landing gear is designed to operate. The spline grooves 100 in addition to acting as such serve to stiffen the lower leg tubes.

I claim:

1. In a landing gear for semi-trailers and the like of the type having upper-outer and lower-inner relatively telescoping tubular leg members actuated by a jackscrew journaled on the upper member engaged with a nut on the lower member, the jackscrew being operated by a shaft and gearing in a housing at the upper end of the upper leg member, improved leg structure wherein said gear housing consists of a cup-shaped metal stamping having an external surface portion welded to an end portion of the upper leg member, said stamping having a central bottom opening through which the jackscrew extends and having internal surface portions adjacent said opening on which the jackscrew is journaled, the surfaces of said external and internal portions being those formed by the stamping without further machining, said stamping having upwardly projecting side walls pierced at two generally diametrically opposite locations to provide openings, and bushings press fitted into said openings for rotatably receiving the jack-screw operating shaft, the surfaces of said stamping engaged by said bushings for positioning the same being the surfaces formed by the stamping and piercing without aditional machining.

2. The combination defined in claim 1 wherein said external surface portion comprises a generally radial shoulder which is welded to the upper end face of the upper leg member, said shoulder extending around substantially the outer periphery of said stamping.

3. The combination defined in claim 1 wherein said internal surface portions of said stamping include a generally radially extending surface immediately adjacent said bottom opening and a contiguous generally cylindrical surface, the latter said surfaces being adapted to supportingly engage and position a bearing for said jackscrew.

4. The combination defined in claim 1 wherein said positioning surfaces of said stamping engaged by said bushings include the wall surfaces of said bushing openings and surface portions of said stamping surrounding said bushing openings, said bushings having flange portions which engage the latter said surface portions.

5. In a landing gear for semi-trailers and the like of the type having upper-outer and lower-inner relatively telescoping tubular leg members actuated by a jackscrew journaled on the upper member engaged with a nut on the lower member, the jackscrew being operated by a shaft and gearing in a housing at the upper end of the upper leg member, improved leg structure wherein said gear housing comprises a cup-shaped metal stamping having in longitudinal succession from one end to the other:

a cylindrical portion pierced at two generally diametrically opposite locations to provide openings, bushings press fitted into said openings for rotatably receiving the jackscrew operating shaft, the surfaces of said stamping engaged by said bushings for positioning the same being the surfaces formed by the stamping and piercing without additional machining, an external annular face which adjoins said cylindrical portion and extends generally radially inwardly therefrom to form a shoulder engaged against an end portion of the leg member, a portion extending away from said annular face at an inward angular direction and terminating in a portion of smaller diameter having an internal surface portion which is generally cylindrical, and a bottom wall adjacent the latter-said portion having an opening through which the jackscrew extends, said bottom wall providing a generally radial internal surface portion and an external surface portion, said internal surface portions being cooperable to provide means for journaling the jackscrew on said cup, the latter-said external surface portion being adapted to engage a thrust bearing for said jackscrew, said internal and external surface portions being those formed by the stamping without further machining.

References Cited in the file of this patent

UNITED STATES PATENTS

| | | |
|---|---|---|
| 1,706,710 | Seldon | Mar. 26, 1929 |
| 1,914,149 | Mizer et al. | June 13, 1933 |
| 2,082,033 | Seyferth et al. | June 1, 1937 |
| 2,523,152 | Seyferth | Sept. 19, 1950 |
| 2,565,401 | Smith | Aug. 21, 1951 |
| 2,655,340 | Dalton | Oct. 13, 1953 |